*Patented May 9, 1939*

2,157,877

UNITED STATES PATENT OFFICE 2,157,877

POLYAZO DYESTUFFS

Hermann Winkeler, Ludwigshafen-on-the-Rhine, and Albert Petz, Mannheim, Germany, assignors to General Aniline Works, Inc., New York, N. Y., a corporation of Delaware No Drawing. Application August 31, 1938, Serial No. 227,849. In Germany February 24, 1937

5 Claims. (Cl. 260—175)

The present invention relates to polyazo dyestuffs.

We have found that valuable polyazo dyestuffs are obtained by coupling the diazo compounds of aromatic amines of the general formula:—

(in which R is the radicle of a sulfosalicylic acid in which the carboxylic group is in meta-position to the —NH-group and $R_1$ is a phenyl radicle) with amines capable of coupling and treating the resulting dyestuffs with phosgene, or by coupling two molecular proportions of a diazo compound of the above-mentioned kind with one molecular proportion of a urea capable of coupling from two molecular proportions of an amino compound.

Suitable diazo components are in particular 3-amino-benzoyl-2'- or 4'-hydroxy-3'-carboxy-1'-amino-benzene-5'-sulfonic acid, 4-amino-benzoyl-2'- or 4'-hydroxy-3'-carboxy-1'-aminobenzene-5'-sulfonic acid as well as their derivatives substituted in the aminobenzoyl radicle, as for example 4-chlor-, -methyl-, or -methoxy-3-aminobenzoyl-2'- or -4'-hydroxy-3'-carboxy-1'-aminobenzene-5'-sulfonic acid.

As azo components there may be mentioned not only aromatic amines but also heterocyclic amino compounds capable of coupling, as for example meta-toluidine, para-cresidine, aminohydroquinone dimethyl ether, and also 1-(3'- or 4'-aminophenyl)-3-methyl-5-pyrazolone, aminophenylpyrazolone carboxylic acids and their esters and amides, as for example 1-(4'-aminophenyl)-3-carboxy-5-pyrazolone.

The dyestuffs are generally speaking prepared by treating with phosgene in alkaline solution the aminoazo dyestuffs prepared from the diazotized amine and the amino compound capable of coupling. Instead of amino compounds, there may also be used compounds capable of coupling which are capable of being converted into amines; for example the diazo compound may be coupled with a nitrophenylpyrazolone, the nitroazo dyestuff reduced to the aminoazo dyestuff and then treated with phosgene. In many cases, especially when using heterocyclic amino compounds as coupling components, these may first be treated with phosgene and the resulting urea coupled with two molecular proportions of the diazo compound.

The new dyestuffs are substantive and are especially suitable for dyeing vegetable fibres and regenerated cellulose, yellow to red shades of color usually being obtained. The new dyestuffs, if desired mixed with a wool dyestuff, may also be used for dyeing mixed fabrics of wool and vegetable fibres or regenerated cellulose, the dyeings preferably being after-treated with metal salts, in particular chromic or copper salts. The dyeings thus obtained have excellent fastness to moisture.

The following examples will further illustrate how our said invention may be carried out in practice but the invention is not restricted to these examples. The parts are by weight.

Example 1

352 parts of 3-aminobenzoyl-2'-hydroxy-3'-carboxy-1'-aminobenzene-5'-sulfonic acid are dissolved in 4000 parts of water while adding the calculated amount of sodium carbonate. 72 parts of sodium nitrite are added to the neutral solution and it is allowed to flow at from 12° to 15° C. into a mixture of 450 parts of 36.5 per cent hydrochloric acid and 500 parts of water. The whole is stirred for another hour and the excess of sodium nitrite is then destroyed. The diazonium solution thus prepared is allowed to flow into a solution, at 15° C., of 107 parts of meta-toluidine in 1000 parts of water and 110 parts of 36.5 per cent hydrochloric acid, the mineral acid being neutralized by slowly dropping in a solution of sodium acetate. The coupling is completed by stirring the acetic acid solution for a long time. Sodium carbonate is added to the reaction mixture until it is alkaline and then phosgene is led in at from 30° to 40° C. until no aminoazo dyestuff can be detected. Care is taken by the addition of soda that the solution always remains alkaline. The disazo dyestuff formed is filtered off by suction and dried. It dyes vegetable fibres reddish yellow shades.

The dyestuff is also suitable for dyeing mixed fabrics of wool and regenerated cellulose in a weak acid bath, as for example in the presence of ammonium sulphate and sodium chromate, i. e. by the so-called metachrom process. The fastness to moisture of the dyeings prepared directly or by the metachrom process may be greatly improved by an aftertreatment with metal salts, such as copper sulphate or especially chromic salts such as chromic sulphate, chromic fluoride, chromic formate or chromic acetate.

If para-cresidine or aminohydroquinone dimethyl ether be used in the preparation of the dyestuff instead of metatoluidine, dyestuffs having similar properties are obtained which dye redder shades. Instead of the said diazo component there may also be used 4-aminobenzoyl-2'-hydroxy-3'-carboxy-1'-aminobenzene-5'-sulfonic acid, a redder dyestuff also being obtained in this case. The dyestuffs from 3- or 4-aminobenzoyl- or 4-chlor-3-aminobenzoyl-4'-hydroxy-3'-carboxy-1'-aminobenezene-5'-sulfonic acid have similar properties but somewhat smaller solubility.

*Example 2*

386.5 parts of 4-chlor-3-aminobenzoyl-2'-hydroxy-3'-carboxy-1'-aminobenzene-5'-sulfonic acid are diazotized in the manner described in Example 1 and coupled in a solution rendered alkaline with sodium carbonate with 189 parts of 1-(4'-amino-phenyl)-3-methyl-5-pyrazolone. By treating the resulting dyestuff with phosgene, a disazo dyestuff is obtained which dyes vegetable fibres yellow shades. After treatment with metal salts, such as copper sulphate or chromic sulphate, the dyeings have very good fastness properties, in particular a good fastness to moisture, such as fastness to washing, fulling, sea-water and perspiration.

The dyestuff is also suitable for dyeing mixed fabrics of wool and vegetable fibres or regenerated cellulose because it also goes well onto the vegetable fibres in neutral or weak acid baths.

By using other pyrazolones with amino groups instead of 1-(4'-aminophenyl)-3-methyl-5-pyrazolone or by coupling the said diazo compound with nitropyrazolones and reducing, there are obtained after treatment with phosgene dyestuffs having similar properties.

What we claim is:

1. Disazo dyestuffs corresponding to the general formula:

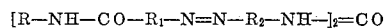

wherein R stands for the radicle of a sulfosalicylic acid in which the carboxylic group is in meta-position to the NH-group shown, wherein R₁ stands for a phenyl radicle, and wherein R₂—NH—stands for the radicle of an amine capable of coupling with diazo compounds selected from the group consisting of amines containing the amino group directly connected to a phenyl nucleus and aminophenylpyrazolones.

2. Disazo dyestuffs corresponding to the general formula

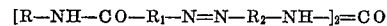

wherein R stands for the radicle of a sulfosalicylic acid in which the carboxylic group is in meta-position to the NH-group shown, wherein R₁ stands for a phenyl radicle, and wherein R₂—NH—stands for the radicle of a phenylamine capable of coupling with diazo compounds.

3. Disazo dyestuffs corresponding to the general formula

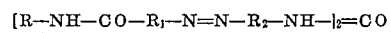

wherein R stands for the radicle of a sulfosalicylic acid in which the carboxylic group is in meta-position to the NH-group shown, wherein R₁ stands for a phenyl radicle, and wherein R₂—NH—stands for the radicle of a 1-aminophenyl-5-pyrazolone.

4. Disazo dyestuffs corresponding to the general formula

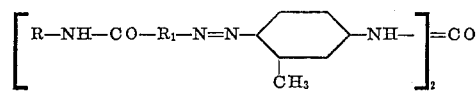

wherein R stands for the radicle of a sulfosalicyclic acid in which the carboxylic group is in meta-position to the NH-group shown, wherein R₁ stands for a phenyl radicle.

5. The disazo dyestuff of the formula

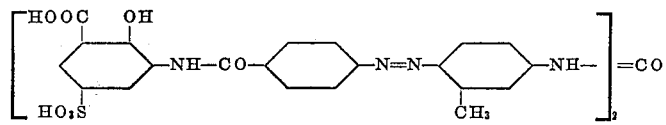

HERMANN WINKELER.
ALBERT PETZ.